June 18, 1957  J. LE FOLL  2,795,931
AERODYNAMIC VALVE ARRANGEMENT
Filed June 5, 1951
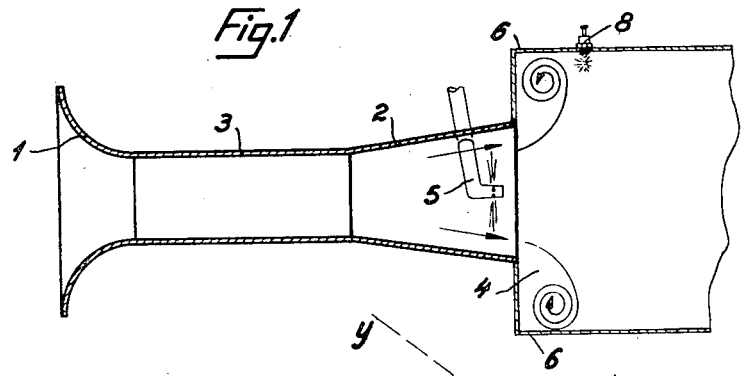
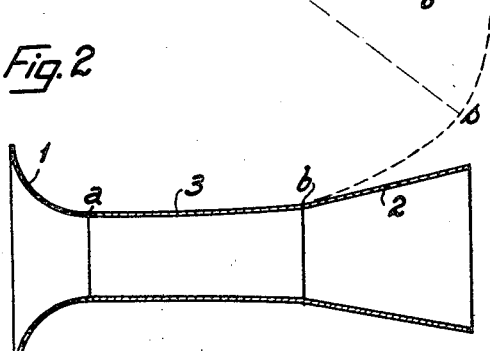
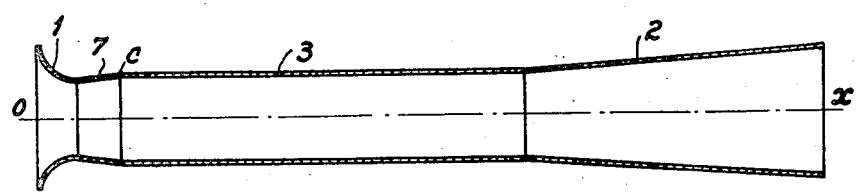
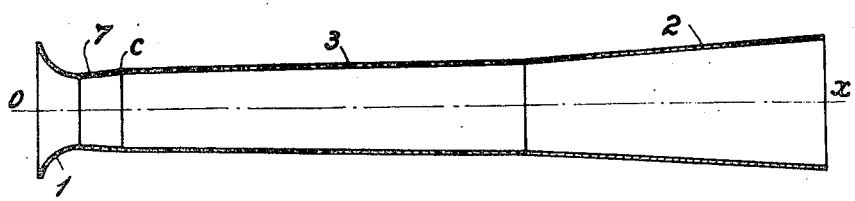
INVENTOR
Jean Le Foll
By Watson, Cole, Grindle & Watson

United States Patent Office 2,795,931
Patented June 18, 1957

2,795,931

AERODYNAMIC VALVE ARRANGEMENT

Jean Le Foll, Le Pre-Saint-Gervais, France, assignor to Societe Nationale d'Etude et de Construction de Moteurs d'Aviation, Paris, France, a company of France Application June 5, 1951, Serial No. 229,945

Claims priority, application France October 11, 1950

10 Claims. (Cl. 60—39.77)

Various types of engines employing a pulsatory combustion are known. As examples of these engines, there may be especially mentioned the Holzwarth turbine, the cylinders of explosion or internal combustion engines and, in more recent times the jet propulsion unit of the flying bombs which are now known as pulse-jet units. In these engines, the problem is to close the air inlet tube sufficiently during each explosion in such manner as to avoid a reflux and a loss of gases through this tube. On the other hand, immediately after the explosion, the air must be able to enter easily in order to permit the filling of the combustion chamber and the formation of the fresh charge.

For the purpose of shutting off the explosion chamber, there have already been proposed either mechanical valves, or aerodynamic valves which are sometimes called static valves; these latter elements are constantly open but are fashioned in such manner that their conductivity for the gaseous flow differs according to the direction of travel. The mechanical valve arrangements which have been used in the combustion chambers of the Holzwarth turbine and in the propulsion units of the first flying bombs and which are also used in the cylinders of engines obviously have the advantage of providing, at least theoretically, a satisfactory closing. However, if the frequency of the pulsatory combustion is relatively high, it becomes very difficult to make the gaseous flow pass through the periodically uncovered orifices and the real output may be reduced in a prohibitive manner. Moreover, the movable mechanical elements subjected to the action of the flames are fragile and their control may involve certain complications. From these various points of view, the purely aerodynamic valves are preferable because they do not comprise any movable element. Various aerodynamic valve arrangements have already been proposed. Certain of them comprise a vortex chamber which is traversed centrifugally by the fluid in the direction of free flow and centripetally in the direction of retarded flow. Others comprise a series of obturator rings or nozzles, the edges of which, at acute angles, are inclined in the direction of free flow in such manner as to create in this direction the minimum loss of pressure, on the other hand, a considerable loss of pressure in the reverse direction. However these apparatus involve certain complications in manufacture.

The aerodynamic valve arrangement forming the subject of the present invention and designed especially to operate under the action of transitional phenomena, which are produced during variable pulsatory operation, is very simple to machine. Moreover, it is able not only to assist the flow towards the combustion chamber while retarding the flow in the reverse direction, but is also able to make the best use of the positive difference which exists, after each explosion or combustion, between the upstream pressure or feeding pressure and the pressure in the combustion chamber in order to improve the filling of the latter for the purpose of the following explosion or combustion. This arrangement makes it possible to increase the output.

In pulse jet units in particular, which are apparatus which take in the supply air from the atmosphere, it has been found that the pressure in the supply chamber, which is much higher than the atmospheric pressure during the combustion or the explosion, becomes very much lower than the said atmospheric pressure after the combustion at the end of the gas ejection period. The value of the depression thus obtained is of the order of 3 p. s. i. for an atmospheric pressure of 15 p. s. i.

It would be thought possible to employ a convergent-divergent nozzle, commonly known under the name of venturi, for obtaining an air inlet tube functioning as an aerodynamic valve, because such a tube would actually provide different permeabilities in the two directions of flow.

Actually, it is known that it is possible to obtain a convergent-divergent nozzle which, taking in air upstream at atmospheric pressure, first of all expands it to the critical pressure at the neck (7.8 p. s. i.) so as to obtain, at this point only, a velocity equal to the velocity of sound, then recompresses it immediately in the divergent section and allows it finally to escape at a pressure slightly lower than atmospheric pressure. Therefore, if the depression in the chamber at the end of the combustion was slight, it would be desirable to use such a nozzle which would give a very good flow for the filling of the chamber. The work supplied by the final expansion of several tenths of a p. s. i. would in part be transformed into heat by the friction in the venturi, and the remainder of this work would be represented by kinetic energy supplied to the air leaving the venturi and entering the chamber, this kinetic energy assisting in producing a certain turbulence and in maintaining the pulsatory rate of combustion. In the opposite direction, the velocity of sound at the neck for a flow which would cause to pass into atmosphere the gases generated in the chamber during the combustion would only be obtained with a pressure in the chamber which is higher than about 24 p. s. i. As the greatest flow which it is possible to obtain through a neck when starting from atmospheric conditions corresponds exactly to the velocity of sound being obtained at the neck, the venturi would thus, because of its simplicity, constitute the ideal supply tube if the depression in the chamber was not greater than a few tenths of a p. s. i. In practice, however, the depression of about 3 p. s. i. which occurs in the chamber after the gases have left through the exhaust tube is excessive for this optimum operation of a venturi. The same applies as regards the work of expansion corresponding to this depression, so that if a venturi as such was employed, there would be obtained in the divergent section, starting from the neck, a supersonic operation with the expansion continuing beyond the critical pressure, the pressure only rising in the final part of the divergent section to reach the pressure in the chamber and the two regions being separated in the divergent section by a shock wave non-reversibly transforming into heat the excess of the expansion work obtained in the first part of the venturi.

In the aerodynamic valve which forms the subject of the present invention, this disadvantage is obviated by the fact that the excess of expansion work is, as it were, kept in reserve during the period of pulsatory operation in which the depression in the combustion chamber is excessive in order to be restored in the form of compression work when the depression in the chamber becomes insufficient to assure the delivery of sound to the neck and even subsequently when the pressure in the chamber falls below atmospheric pressure.

In accordance with the invention, the final divergent section of the nozzle, which is connected to the chamber to be supplied and the divergent angle of which may be as large as desired with the sole condition of avoiding fluid detachment, is preceded by a cylindrical tube or a tube having very slight divergence which acts as an accumulator of recoverable kinetic energy and constitutes the main elements of the device (in the following description, this will be called an "accumulator tube").

This tube will generally be preceded by a convergent inlet serving to initiate the expansion of the entrant air and to accelerate it.

If it is a question of a constant flow, the expansion initiated in this convergent inlet and stopped in the tube at its value at the neck would be continued in the final divergent section and supersonic operation would be obtained. There would be no difference at all with respect to that which would take place in a normal venturi, except perhaps the loss of energy by friction on the wall of the tube, and the part played by the latter would be rather undesirable. However, in the case of a variable operation of the type under consideration which is controlled by the pressure oscillations in the combustion chamber, the mass of air contained in the accumulator tube must be accelerated, starting from a zero speed, under the action of the depression which occurs in the chamber before the speed corresponding to a supersonic rate of flow in the divergent section is obtained. It is then necessary that the depression lasts a certain length of time in order that this mass of air passes from its zero speed to the speed of the continuous operation. By giving a relatively large value to the length of the tube and consequently to the mass of air which it encloses, it is then possible to delay the moment at which the speed of the continuous flow would be obtained beyond the moment at which the pressure has risen sufficiently in the chamber in order to make it impossible to obtain this speed without, however, limiting the delivery through the tube, since this delivery is in any case limited by the sonic rate at the neck. Consequently there is no longer irreversibility and all the kinetic energy stored in the mass of air which traverses the tube may be utilized for filling the combustion chamber by being restored in the form of work of compression from the upstream pressure to a higher pressure in the combustion chamber, the filling of the latter being considerably improved.

However, the final divergent section will preferably be shorter than that which would correspond to a complete transformation of the kinetic energy into work of compression because it is desirable that the air leaving the divergent section conserves a residual kinetic energy in such manner as to generate in the chamber a turbulence which is favorable to the combustion.

Since the loss due to irreversibility when passing to supersonic flow is of the order of the third power of $M-1$, M being the Mach number, it is desirable, in order to increase the energy capable of being stored per unit of volume at the cost of a slight loss, to obtain a slightly supersonic rate of flow with a Mach number of the order of 1.4 to 1.8 by placing a very short divergent section in front of the inlet to the accumulator tube.

The description which follows, taking in conjunction with the accompanying drawing which is given simply by way of example, will enable it to be understood how the invention may be carried into effect, the details which will be apparent from the drawing and the description obviously forming part of the said invention.

Figure 1 is an axial section showing in thick lines one embodiment of an aerodynamic valve according to the invention. In this figure, this arrangement is assumed to be applied to a combustion chamber such as that of a pulse-jet unit, the front portion of which is shown in thin lines.

Figure 2 is a sectional view of a modified form of the aerodynamic valve.

Figures 3 and 4 are axial sections of two other modifications.

In Figure 1, 1 is the front convergent section of a nozzle and 2 is the rear divergent section of this nozzle which is separated from the convergent section by the accumulator cylinder 3. 4 shows the pulsatory combustion chamber which is to be supplied and 5 is the fuel-injection device.

In this description, it is to be noted that the words "front," "rear," "upstream" and "downstream" relate to the direction of flow which corresponds to the supply of the chamber 4 and for which the air traverses the parts in the order: 1, 3, 2, 4.

The suitably chosen fuel, for example, gasoline is continuously introduced into the injector 5 and it produces successive explosions for a pulsatory combustion in the chamber 4 at a frequency which depends upon the frequency of the sound tube which is formed by this chamber. The supply for starting is obtained, as is known, by the relative wind which passes through the nozzle, in the case of a jet-propulsion unit, by sucking in compressed air through the nozzle and by providing the initial ignitions in the chamber by means of a spark plug 8.

The gases produced at each explosion are expelled at the rear part of the freely open chamber, either for forming a propulsion jet in the case of a jet unit or for driving a turbine rotor.

The rate of pulsatory combustion being attained, it is established that each compression wave in the chamber at the moment of the explosion is followed by a depression wave after the exhaust of the gases. The extent of this depression is such that, if the divergent section 2 of the nozzle were connected directly to the convergent section 1, the flow of atmospheric air drawn in through the nozzle into the chamber, where a state of depression obtains, would very quickly reach the supersonic rate in the part of the divergent section which would follow immediately after the neck, thus producing irreversibility by shock wave and consequently losses of energy, as indicated in the preamble of the specification.

The cylindrical section 3 enables this disadvantage to be avoided. Actually, when there is constant flow, the tube 3 would be useless and even harmful, as has been stated in the preamble, since it would only act to delay the expansion which is commenced in the convergent section 1 and which would be continued in the divergent section 2, but when there is variable rate of operation, the mass of air contained in the tube 3 must be accelerated each time under the action of the depression obtaining in the chamber 4. By making the tube 3 sufficiently long, it is possible sufficiently to retard the instant at which the speed of the air arriving in the divergent section 2 will tend to assume a supersonic value in order that this passing of the speed of sound is not produced, the depression meanwhile having terminated in the chamber 4. Since the flow is not supersonic, there is no non-reversing effect (disregarding the losses by friction). While depression obtains in the chamber, the air traverses the tube 3 while expanding. Each mass element, while flowing towards the chamber, transmits this work of expansion to the elements which follow it in the form of kinetic energy. This energy is therefore conveyed by variable elements, but is comprised between the inlet and the outlet of the tube 3. When the chamber attains excess pressure, the energy thus contained in the tube 3 is propagated in the downstream direction and restored in the form of compression work to the elements which leave the apparatus, this allowing the filling to be continued when the combustion has already commenced. Due to this fact, the arrangement acts as an aerodynamic valve, since it allows the flow to be continued towards the chamber, despite the increase in the pressure in the latter from the commencement of the combustion and, on the other hand, it allows the filling of the chamber to be considerably improved which was not permitted by the earlier aerodynamic valve. Towards the end of the combustion, the gases will tend to escape from inside the chamber towards atmosphere, but this flow will be braked because of the actual length of the tube 3 in which the hot gases collide with cold air of great density. For this reason, it would be desirable to increase the length of the tube, but on the other hand, if this tube were of too great a length, it would be harmful, because the burnt gases which fill this tube at the end of the combustion would have to be drawn into the chamber again before it is possible for fresh air to be introduced. From this aspect, it is appropriate to reduce the volume of the tube 3 and thus there are two contradictory conditions, between which it is necessary to find a compromise. Generally speaking, the tube 3 will be a little longer than the final divergent section 2, which is preferably arranged to assure an almost complete conversion of the kinetic energy into pressure at the time of filling. The residual kinetic energy of the air entering the chamber is favorable to the formation of turbulence, especially in the re-entrant angle 6, which it is advisable to provide at the entrance to the chamber, as shown in practice, in order to assist the maintenance of the pulsatory rate of combustion. Moreover, the energy necessary is relatively small.

The cylinder 3 may be replaced by a tube which is of a section which increases very slowly or which is slightly divergent, for example, by a truncated cone having a half angle at the apex which is less than 2°, although the divergence of the final portion 2 may be as large as possible (half angle at the apex of 3 to 7°), with the sole reservation that fluid detachment is avoided.

The cylindrical tube 3 may also be replaced by a section of a surface of revolution, the meridian line of which would be an arc having a large radius of curvature (parabolic or hyperbolic arc, for example), in such manner as to maintain, for a relatively long length, a section similar to that of the neck.

Figure 2 shows a modification of this nature.

Interposed between the front convergent section 1 and the final divergent section 2 is the section 3 which is slightly divergent and the meridian line of which is formed by a parabolic arc $a$—$b$ having a large radius of curvature (the remainder of the parabola is shown in broken lines, the apex of the parabola being at $s$ and its axis as $sy$).

Instead of being maintained at subsonic rate, it is also possible to make the arrangement such that it gives a slightly supersonic rate of flow to correspond to a small Mach number, for example, in the region of 1.4. In this case, the intensity of the shock wave and the loss due to non-reversibility are small and there is obtained the advantage of improvement in the operation of the valve arrangement, since the supersonic flow which is possible in the direction of flow towards the combustion chamber is not the same in the reverse direction.

For this purpose, and as shown in Figure 3, there is arranged in front of the cylindrical section 3, between this section and the convergent entrance 1, a short divergent section 7 which is shaped in such manner as to obtain the small Mach number which is desired by increasing the section of the neck in a ratio of the order of 1.1.

The modification shown in Figure 4 differs from that of Figure 3 only by the fact that the accumulator tube 3 is slightly conical instead of being cylindrical, this slight divergence of the tube 3 allowing the losses by friction on the wall of the tube 3 to be compensated for by increasing the speed.

It will be noted that the embodiments according to Figures 3 and 4, which are the preferred forms, comprise this feature of having a meridian line or half-section which shows a point of change of curve at $c$ at the junction between the small divergent section 7 and the tube 3.

Moreover, if A indicates the quotient of the section at any point of the axis $ox$ by the section at the neck, the parts 7, 3 and 2 will satisfy the following conditions:

In the part 7:

$$1<A<1.1$$

In the cylindrical or slightly conical part 3:

$$1.1<A<1.3$$

In the final divergent section 2:

$$1.3<A$$

at the outlet of the final divergent section, A is generally greater than 2.

Moreover, if there are drawn the straight line joining the ends of the section 7 on the meridian line, then the straight line joining the ends of the section 3 and finally, that joining the ends of the section 2, and if $\alpha$, $\beta$, $\gamma$ are the respective angles of these straight lines with the axis of revolution $ox$, these angles will satisfy the relations:

$$\alpha>\beta$$
$$\gamma>3\beta$$
$$\beta<2°$$

By way of example, it is possible to have:

$$\alpha \text{ and } \gamma>3°$$
$$\beta<30'$$

What I claim is:

1. The combination, with a resonant-firing combustion chamber having a head end wall substantially inclined to the axis of said chamber and a substantially unobstructed orifice in said wall, of an air-intake valve of the static type comprising a diverging pipe freely opening into said combustion chamber through said orifice, the divergence of said pipe being substantially smaller than that of said wall, and a tubular section leading to said diverging pipe and generally coaxial therewith, said tubular section having a divergence which is substantially smaller than that of said diverging pipe.

2. Air-intake valve as claimed in claim 1, further comprising fuel injecting means inside the diverging pipe, in the vicinity of the orifice in the head end wall of the combustion chamber.

3. Air-intake valve as claimed in claim 1, wherein the tubular section is substantially longer than the diverging pipe.

4. Air-intake valve as claimed in claim 1, further comprising a converging air inlet passage leading to the tubular section and generally coaxial therewith.

5. Air-intake valve as claimed in claim 4, further comprising a diverging duct extending between the converging passage and the tubular section and generally coaxial therewith, the divergence of said duct being substantially greater than that of said section.

6. Air-intake valve as claimed in claim 5, wherein the outline of said valve shows a point of inflexion at the connection of the diverging duct with the tubular section.

7. Air-intake valve as claimed in claim 5, wherein the ratio of the end cross-sections of the diverging duct is at most 1·1:1.

8. Air-intake valve as claimed in claim 1, wherein the ratio of the end cross-sections of the tubular section is at most 1·3:1·1 and at least 1:1.

9. The combination, with a resonant-firing combustion chamber having a head end, of an air-intake valve of the static type comprising, in succession and coaxial arrangement, a converging air inlet passage, a frusto-conical diverging duct, a frusto-conical diverging section, and a frusto-conical diverging pipe opening into said combustion chamber at the head end thereof, the generatrices of said frusto-conical duct, section and pipe making with the axis of the valve angles $\alpha$, $\beta$ and $\gamma$ respectively, such that $$\alpha>\beta,$$
$$\beta<2°,$$
$$3°<\gamma<7°, \text{ and}$$
$$\gamma>3\beta.$$

10. Air-intake valve as claimed in claim 9, wherein $$\alpha > 3°,$$
$$\beta < 30',\text{ and}$$
$$\gamma > 3°.$$

References Cited in the file of this patent

UNITED STATES PATENTS

| | | |
|---|---|---|
| 1,983,405 | Schmidt | Dec. 4, 1934 |
| 2,414,828 | McCollum | Jan. 28, 1947 |
| 2,525,782 | Dunbar | Oct. 17, 1950 |
| 2,543,758 | Bodine | Mar. 6, 1951 |
| 2,563,305 | Britton et al. | Aug. 7, 1951 |
| 2,574,460 | Bohanon | Nov. 13, 1951 |
| 2,587,100 | Black | Feb. 26, 1952 |
| 2,599,209 | Tenney | June 3, 1952 |
| 2,609,660 | Tenney | Sept. 9, 1952 |
| 2,612,722 | Tenney | Oct. 7, 1952 |
| 2,612,749 | Tenney | Oct. 7, 1952 |
| 2,618,925 | Wislicenus | Nov. 25, 1952 |